3,426,043
**2-GUANIDINYLMETHYL-2,3-
DIHYDROBENZOFURANS**
Peter N. Green and Maurice Shapero, London, England, assignors to Ward Blenkinsop & Company Limited, London, England, a British company
No Drawing. Filed Nov. 28, 1966, Ser. No. 597,210
Claims priority, application Great Britain, Nov. 26, 1965, 50,450/65
U.S. Cl. 260—346.2        8 Claims
Int. Cl. C07d 5/42

This invention relates to the production of 2-guanidinylmethyl-2,3-dihydrobenzofurans which are prepared by heating together a 2-aminomethyl-2,3-dihydrobenzofuran or a salt thereof, and cyanamide. These compounds show hypotensive properties.

This invention relates to the production of pharmacologically valuable guanidine derivatives.

In accordance with the present invention there is provided a 2-guanidinylmethyl-2,3-dihydrobenzofuran having the general formula

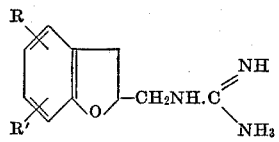

in which each of R and R' is a hydrogen or a halogen atom or an alkyl or alkoxy group having one to six carbon atoms.

The substituents R and R' may be in any of the four available positions in the benzene ring of the 2,3-dihydrobenzofuran structure.

The invention also includes the acid addition salts, i.e., the corresponding guanidinium salts, of the said compounds such as the hydrochloride, nitrate, sulphate, lactate, acid tartrate, acid citrate and acid maleate.

According to a feature of the invention the 2-guanidinylmethyl-2,3-dihydrobenzofurans having the above general formula may be prepared by heating together a 2-aminomethyl-2,3-dihydrobenzofuran having the general formula

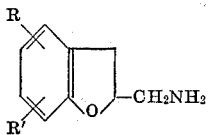

in which R and R' are as above defined, or a salt thereof, and cyanamide. The reaction is conveniently effected in solution in water, ethanol, aqueous ethanol, or other water-miscible alcohol or ether alcohol. The products of the reaction are the corresponding bases or salts. The reaction product is conveniently isolated by conversion to a water or alcohol-insoluble salt such as the bicarbonate: this can be effected by addition of sodium or potassium bicarbonate to the reaction mixture. The bicarbonate can then be isolated, e.g. by filtration, suspended in water and decomposed by the addition of a stronger acid, e.g., a mineral acid such as nitric acid or an organic acid such as citric or tartaric acid. The corresponding salt can then be crystallised from aqueous or alcoholic medium.

The 2-aminomethyl 2,3-dihydrobenzofurans having the substituents R and R' which are used may be produced by the reaction of the corresponding 2-halomethyl-2,3-dihydrobenzofuran, such as the 2-bromomethyl compound, with an alkali metal phthalimide in the presence of a dialkyl formamide, such as dimethylformamide, to form the corresponding 2-phthalimidomethyl - 2,3 - dihydrobenzofuran and the latter is then reacted with hydrazine to form the 2-aminomethyl compound (Manske-Inge reaction). Thus there may be used 2-aminomethyl-2,3-dihydrobenzofuran, 2-aminomethyl-2,3-dihydro-5-methylbenzofuran, 2-aminomethyl-2,3-dihydro-6-methylbenzofuran, 2-aminomethyl-2,3-dihydro-7-methylbenzofuran, 2-aminomethyl-2,3-dihydro-5-methoxybenzofuran, 2-aminomethyl-2,3-dihydro-5-chlorobenzofuran, 2-aminomethyl-2,3-dihydro-5-bromobenzofuran, 2-aminomethyl-2,3-dihydro - 7 - fluorobenzofuran, or 2-aminomethyl-2,3-dihydro-4,6-dimethylbenzofuran. Alternatively, they may be produced by hydrogenative scission of the corresponding 2-benzylaminomethyl-2,3-dihydrobenzofurans having the substituents R and R' in the presence of a catalyst such as Raney nickel or palladium.

The compounds of the present invention show hypotensive properties which are associated with spasmolytic properties, adrenergic neurone blocking properties and/or adrenolytic properties. In particular cases the latter properties may be the more marked. For example the compound of Example 5 has pronounced adrenergic neurone blocking properties when tested either by the Finklemann method or on the nictitating membrane in a conscious cat, while the compound of Example 4 has marked spasmolytic properties when tested against isolated guinea pig ileum in Tyrode solution. The compound of Example 7 exerts a depressant action upon the central nervous system.

The following examples illustrate the nature of the present invention.

EXAMPLE 1

2-guanidinium-methyl-2,3-dihydrobenzofuran nitrate

A solution of cyanamide (10 g.), 2-aminomethyl-2,3-dihydrobenzofuran hydrochloride (9.27 g.) in water (60 ml.) was refluxed for 24 hours. The mixture was then cooled to 0° C., filtered, the filtrate warmed and potassium bicarbonate (5 g.) added. On cooling, the precipitated bicarbonate was collected, suspended in hot water (40 cc.) and acidified with 8 normal nitric acid. On cooling and standing 2-guanidinium-methyl-2,3-dihydrobenzofuran nitrate separated and was collected by filtration. After washing with ice water and drying it was obtained as a white solid which melted at 119 to 121° C.

Analysis.—Calculated for $C_{10}H_{14}N_4O_4$: C, 47.25%; H, 5.55%; N, 22.05%. Found: C, 47.46%; H, 5.74%; N, 22.22%.

EXAMPLE 2

2-guanidinium-methyl-2,3-dihydro-5-methyl-benzofuran nitrate

A solution of cyanamide (10 g.) and 2-aminomethyl-2,3-dihydro-5-methyl-benzofuran hydrochloride (9.2 g.) in water (60 ml.) were reacted and worked up as described in Example 1 to yield 2-guanidinium-methyl-2,3-dihydro-5-methyl-benzofuran nitrate as a white crystalline solid having a melting point of 132 to 134° C.

Analysis.—Calculated for $C_{11}H_{16}N_4O_4$: C, 49.23%; H, 6.01%; N, 20.88%. Found: C, 49.41%; H, 6.08%; N, 21.00%.

EXAMPLE 3

2-guanidinium-methyl-2,3-dihydro-5-methoxybenzofuran nitrate

A solution of cyanamide (10 g.) and 2-aminomethyl-2,3-dihydro-5-methoxybenzofuran hydrochloride in water (60 ml.) was reacted and the product isolated as described in Example 1. 2-quanidinium-methyl-2,3-dihydro-5-methoxybenzofuran nitrate was obtained as a white crystalline solid, having a melting point of 119 to 121° C.

Anaylsis.—Calculated for $C_{11}H_{16}O_5N_4$: C, 46.46%; H, 5.67%; N, 19.71%. Found: C, 46.70%; H, 5.85%; N, 19.81%.

EXAMPLE 4

2-guanidinium-methyl-2,3-dihydro-5-chlorobenzofuran nitrate

A solution of cyanamide (10 g.) and 2-aminomethyl-2,3-dihydro-5-chlorobenzofuran hydrochloride (10.85 g.) in water (60 ml.) was reacted and the product isolated as in Example 1 to give 2-guanidinium-methyl-2,3-dihydro-5-chlorobenzofuran nitrate as a white crystalline solid having a melting point of 157 to 159° C.

*Analysis.*—Calculated for $C_{10}H_{13}N_4O_4Cl$: C, 41.59%; H, 4.54%; H, 19.40%. Found: C, 41.78%; H, 4.57%; N, 19.35%.

EXAMPLE 5

2-guanidinium-methyl-2,3-dihydro-7-methylbenzofuran nitrate

A solution of cyanamide (10 g.) and 2-aminomethyl-2,3-dihydro-7-methylbenzofuran hydrochloride (10 g.) in water (60 ml.) was reacted and worked up as described in Example 1. The reaction product was crystallised from isopropyl alcohol giving white crystals, melting point 129 to 131° C.

*Analysis.*—Calculated for $C_{11}H_{16}N_4O_4$: C, 49.23%; H, 6.01%; N, 20.88%. Found: C, 49.08%; H, 6.18%; N, 20.65%.

EXAMPLE 6

2-guanidinium-methyl-2,3-dihydro-4,6-dimethylbenzofuran nitrate

A solution of cyanamide (10 g.) and 2-aminomethyl-2,3-dihydro-4,6-dimethylbenzofuran hydrochloride (10.7 g.) in water (60 ml.) was reacted and worked up as described in Example 1. The reaction product was crystallised from isopropyl alcohol giving white crystals, melting point 156 to 158° C.

*Analysis.*—Calculated for $C_{12}H_{18}N_4O_4$: C, 51.05%; H, 6.43%; N, 19.86%. Found: C, 51.26%; H, 6.56%; N, 19.62%.

EXAMPLE 7

2-guanidinium-methyl-2,3-dihydro-7-fluorobenzofuran nitrate

A solution of cyanamide (20 g.) and 2-aminomethyl-2,3-dihydro-7-fluorobenzofuran hydrochloride (20.4 g.) in water (120 ml.) was reacted and the product isolated as described in Example 1. 2-guanidinium-methyl-2,3-dihydro-7-fluorobenzofuran nitrate was obtained as a white crystalline solid, having a melting point of 143 to 144° C.

*Analysis.*—Calculated for $C_{10}H_{13}O_4N_4F$: C, 44.12%; H, 4.81. Found: C, 44.30%; H, 4.98%.

The new guanidine derivatives of the present invention are preferably administered subcutaneously, although oral administration, for example in the usual tablet form with conventional tabletting excipients, is also possible. Suitable dosages range from 8 to 25, and preferably from 10 to 20, milligrams per kilogram of body weight of the patient being treated.

We claim:

1. A 2-guanidinylmethyl 2,3-dihydrobenzofuran having the formula

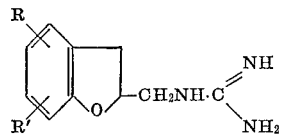

in which each of R and R' is selected from hydrogen and halogen atoms and alkyl and alkoxy groups having one to six carbon atoms, and acid addition salts thereof.

2. The compound claimed in claim 1, in which R is a hydrogen atom and R' is a hydrogen atom, and acid addition salts thereof.

3. The compound claimed in claim 1, in which R is a hydrogen atom and R' is a methyl group present in the 5-position, and acid addition salts thereof.

4. The compound claimed in claim 1, in which R is a hydrogen atom and R' is a methoxy group present in the 5-position, and acid addition salts thereof.

5. The compound claimed in claim 1, in which R is a hydrogen atom and R' is a chlorine atom present in the 7-position, and acid addition salts thereof.

6. The compound claimed in claim 1, in which R is a hydrogen atom and R' is a methyl group present in the 7-position.

7. The compound claimed in claim 1, in which R is a methyl group present in the 4-position and R' is a methyl group present in the 6-position.

8. The compound claimed in claim 1, in which R is a hydrogen atom and R' is a fluorine atom present in the 7-position.

References Cited

UNITED STATES PATENTS 3,153,057   10/1964   Baines et al. _____ 260—346.2

NICHOLAS S. RIZZO, *Primary Examiner.*

BERNARD I. DENTZ, *Assistant Examiner.*

U.S. Cl. R.X.

260—999

Notice of Adverse Decision in Interference

In Interference No. 97,210 involving Patent No. 3,426,043, P. N. Green and M. Shapero, 2-GUANIDINYLMETHYL-2,3-DIHYDROBENZOFURANS, final judgment adverse to the patentees was rendered Aug. 26, 1971, as to claims 1 and 6.

[*Official Gazette December 21, 1971.*]